July 30, 1963   R. H. NILSSON   3,099,169
BRAKE PISTON STROKE REDUCING MECHANISM IN VEHICLE BRAKES
Filed Sept. 18, 1961   2 Sheets-Sheet 1

3,099,169
BRAKE PISTON STROKE REDUCING MECHANISM
IN VEHICLE BRAKES
Ragnar Hjalmar Nilsson, Malmo, Sweden, assignor to
Svenska Aktiebolaget Bromsregulator, Malmo, Sweden,
a corporation of Sweden
Filed Sept. 18, 1961, Ser. No. 138,821
Claims priority, application Germany Sept. 26, 1960
3 Claims. (Cl. 74—518)

This invention relates to vehicle brakes comprising a brake lever forming part of a brake gear for transmitting brake power from the brake piston of a brake cylinder to brake shoes to be applied against the wheels of the vehicle. More particularly the invention relates to the combination with such a brake lever of means for fulcruming the brake lever at a point determining a relatively high leverage of the brake lever during the development of brake pressure after the brake shoes have been applied against the wheels of the vehicle on braking, and of mechanism comprising an abutment on the brake lever and a supporting abutment for said brake lever abutment to coact with for fulcruming the brake lever at a point determining a relatively low leverage of the brake gear during that part of the brake piston stroke on braking which is consumed for applying the brake shoes against the wheels of the vehicle. The principal object of the combination is known and is to shorten that part of the brake piston stroke on braking which is consumed for applying the brake shoes against the wheels.

The longer the brake applying movement of the brake piston on braking, the larger the consumption of pressure medium in the brake cylinder. In most instances it is not possible to shorten the brake applying movement of the brake piston by reducing the brake shoe clearances, because these are determined comparatively exactly by the construction of the brake gear. This explains why it has been proposed to shorten the brake applying movement of the brake piston by the combination with a brake lever of means and mechanism of the general character stated above.

Elucidating examples of the prior proposals are to be found for instance in U.S. patent specifications 2,251,267 and 2,384,257. U.S. patent specification 2,251,267 in principle proposes a disengageable support for supporting a brake lever of the brake gear in a point determining a relatively low leverage of the brake lever during the brake applying movement. For cutting in a higher leverage for the development of brake pressure this support is disengaged at the end of the brake applying movement by control means operating in dependence on the stroke of the brake piston, and is again engaged upon release of the brake. This mechanism entails the disadvantage that the support is disengaged suddenly and causes an abrupt transition from the lower brake applying leverage to the higher leverage for the development of brake pressure. To make this transition less abrupt and to ensure that the development of brake pressure after the brake shoes have been applied against the wheels, takes place over the higher and not over the lower leverage, the mechanism later proposed by U.S. patent specification 2,384,257 comprises, in combination with the support for supporting the brake lever in the point determining the lower leverage, a spring limiting the supporting ability of the support and smoothly initiating the transition from the lower to the higher leverage. However, this involves the disadvantage that the resistance to the brake applying movement, which always is at its highest in the starting position of this movement, may produce an excessive pressure on the support already at the moment the brake applying movement is about to start, to which excessive pressure the spring yields. The yielding of the spring manifests itself as a resistance to the brake applying movement and therefore increases the already excessive total resistance to the brake applying movement. A premature yielding of the spring may produce a premature transition from the lower to the higher leverage, and this may unfavourably affect the operation of the brake. Consequently, also the later developed mechanism is not fully satisfactory, although it offers distinct advantages over the first-mentioned older mechanism thanks to the fact that the support for supporting the brake lever in the point determining the lower leverage is formed as a pivotally and resiliently supported roller and that the brake lever for its coaction with this roller is formed with a curved roller track. Another disadvantage of the later developed and more satisfactory of the two earlier mechanisms is that the resiliency of the support for supporting the roller is not readily adapted to the different conditions encountered when the mechanism is installed in a customary goods wagon with a comparatively light brake gear and a brake applying time of at least 3.5 seconds, or in a passenger coach with a quick-acting brake with control means safe-guarding against sliding of the wheels, where the brake applying time may amount to a fraction of a second only and the brake gear can be very heavy. If the mechanism can be used for goods wagons, then it is unsuitable for passenger coaches. In addition, the comparatively wide variations in the resistance to the movement of the brake gear from one wagon to another cause difficulties in determining the resiliency of the support for the roller.

The present invention has for its object to provide a still further developed mechanism which obviates the drawbacks of said earlier mechanisms fundamentally by rendering the mode of operation of the mechanism independent of the magnitude of the resistance to the brake applying movement in the starting position thereof.

This mechanism for producing short brake piston strokes in vehicle brakes is of the type in which a brake lever during the brake applying movement on braking is supported in a point determining a relatively low leverage by an abutment of the lever engaging a supporting abutment, and in which one of these coacting abutments is pivotally mounted and spring-loaded so as to yield to an excessive pressure between the abutments. According to the invention the two coacting abutments are so interrelated in respect of their shapes and and dispositions that the pressure between them in their mutual position at released brake, i.e. the position from which the brake applying movement starts and in which the resistance to this movement is at its highest, biases the pivotally mounted spring-loaded abutment in the same direction in which this abutment is spring-loaded, and that the pressure between the abutments during the brake applying movement begins to counteract the spring load on the pivotally mounted and spring-loaded abutment only after the brake applying movement has started and caused a certain change in the mutual position of the abutments.

One of the two coating abutments is preferably formed as a curved roller track for the other abutment which is formed as a rotatable roller, and preferably this roller is mounted on the brake lever rotatably about the point determining the lower leverage, while the pivotally mounted spring-loaded abutment is shaped with the curved roller track and forms the support for supporting the abutment on the brake lever.

The above described embodiment of the mechanism according to the invention is illustrated in the accompanying drawing in which.

Figure 1:
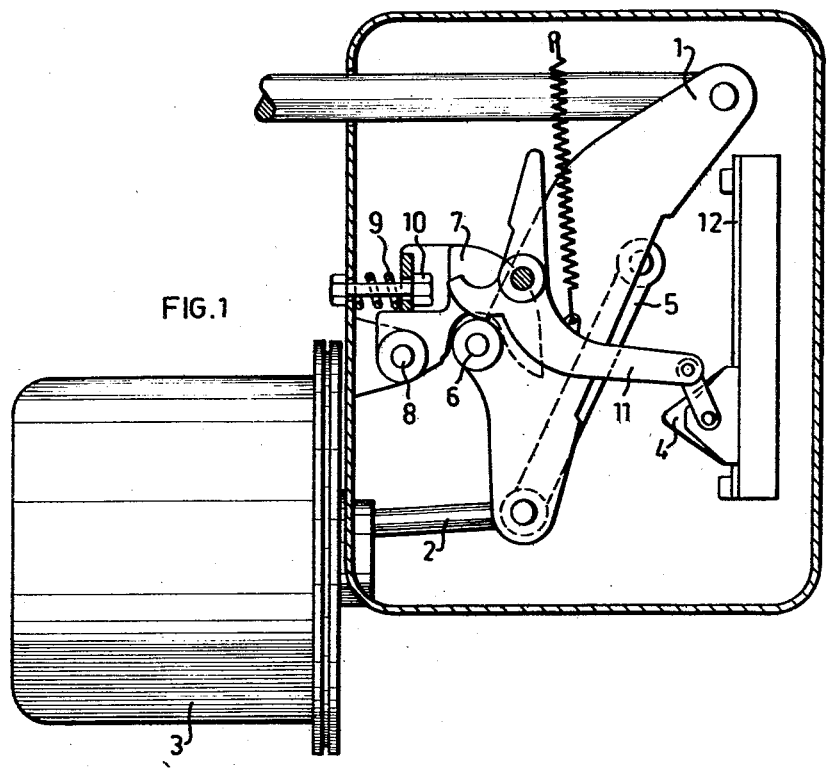
FIGS. 1 and 2 are plan views of the mechanism in its position at released brake and in its position at the end of the brake applying movement, respectively, where the transition from the lower to the higher leverage has occurred.
Figure 3:
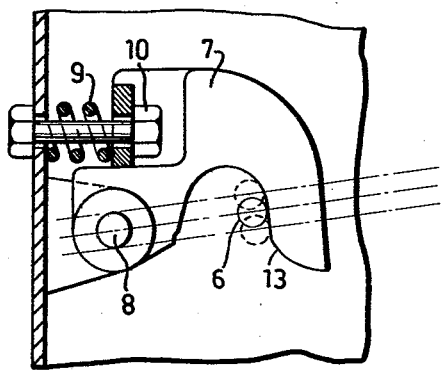
FIG. 3 is a view on a larger scale of the pivotally mounted and spring-loaded support in the first-mentioned position.
Figure 2:
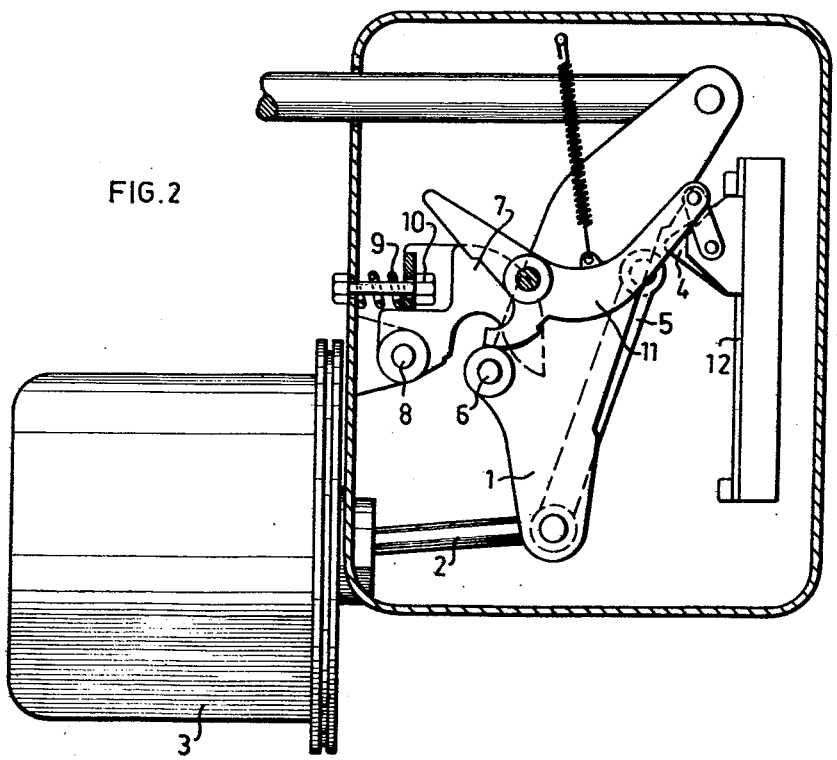

In FIGS. 1 and 2, reference numeral 1 denotes a brake lever which is pivotally connected at one end with the piston rod 2 of the brake cylinder 3 and coacts with a support 4 serving to support and fulcrum the brake lever in a preferably variable point determining a relatively high leverage. A link 5 is provided for guiding the end of the brake lever 1 connected to the piston rod 2. A roller 6 is rotatably mounted in a point on the lever determining a relatively low leverage and serves as an abutment coacting with a supporting abutment 7 which is best shown in FIG. 3 and is pivotally mounted at a fixed point by means of a pin 8. In the initial position at released brake, which is shown in FIGS. 1 and 3, the abutment 7 which is loaded by a spring 9, bears under the action of this spring load against a fixed abutment 10. Also coacting with the roller 6 is a lever mechanism 11 which serves to actuate the brake lever support or fulcrum 4 which is displaceable along and guided by a fixed track 12.

As can be seen from FIG. 3, the surface of the abutment 7 coacting with the roller 6 is shaped as a curved roller track 13 for the roller 6. As is also apparent from FIG. 3, the two coacting abutments 6 and 7 are so interrelated in respect of their shapes and dispositions that the pressure between them in the position at released brake, i.e. in the starting position of the brake applying movement, biases the pivotally mounted abutment 7 in the same direction in which this abutment is biased by the spring 9. It is therefore mechanically impossible that the resistance to the brake applying movement on braking, which resistance always is at its highest in the starting position of this movement and rules the pressure between the coacting abutments 6 and 7, can produce a premature yielding of the pivotally mounted spring-loaded abutment 7 and thereby a premature transition from the lower to the higher leverage of the brake lever 1. During the course of the brake applying movement, but not before this movement has started and the resistance thereto has decreased, the roller 6 moves downwardly along the abutment 7 under the action of arm 11a on the lever 11 as it moves the support 4 along the track 12 under the action of spring 11b. The point of action of the roller 6 on abutment 7 therefore moves downwardly, and the pressure between the coacting abutments 6 and 7, which at that time also has decreased, begins to act to pivot the abutment 7 in the opposite direction than at the very start of the brake piston movement, so as to counteract the spring load on the pivotally mounted abutment 7 and thereby to ensure the desired smooth transition from the lower to the higher brake lever leverage. It will be seen that the initial point of action lies at the intersection of the profile of the track on abutment 7 and a line perpendicular thereto which passes on the side of the pivot 8 toward spring 9 and abutment 10, which is what, in this embodiment, causes the pressure at the starting point of the brake movement to bias the abutment 7 in the same direction as it is biased by the spring 9. As the roller 6 moves downwardly along abutment 7, the perpendicular to the profile through the point of action passes through the pivot 8 and then on the opposite side of pivot 8 from the spring 9. The pressure will then cause abutment 7 to pivot against the action of spring 9.

What I claim and desire to secure by Letters Patent is:

1. In a vehicle brake comprising a brake lever forming part of a brake gear for transmitting brake power from the brake piston of a brake cylinder to brake shoes to be applied against the wheels of the vehicle, the combination comprising means for fulcruming said brake lever at a point which produces a relatively high leverage of the brake lever during the development of brake pressure after the brake shoes have been applied against the wheels of the vehicle on braking, and mechanism comprising an abutment on said brake lever and a supporting abutment with which said brake lever abutment coacts for fulcruming said brake lever at a point which produces a relatively low leverage of the brake lever during that part of the brake piston stroke which is consumed for applying the brake shoes against the wheels of the vehicle, one of said coacting abutments being pivotally mounted and spring-loaded so as to yield to an excessive pressure between said abutments to permit said brake lever to change from turning about the point which produces the relatively low leverage to turning about the point which produces the relatively high leverage on braking, said two coacting abutments having shapes and being positioned so that the pressure between them in their relative position at released brake biases the pivotally mounted and spring-loaded abutment in the same direction in which this abutment is spring-loaded and that the pressure between said coacting abutments during the movement of the brake piston for applying the brake shoes against the wheels of the vehicle on braking begins to counteract the spring load on said pivotally mounted and spring-loaded abutment only after this brake applying movement has started and caused a certain change in the mutual position of said coacting abutments.

2. The combination claimed in claim 1 wherein the pivotally mounted and spring-loaded coacting abutment has a curved roller track thereon and the other of said abutment is a rotatably mounted roller engaging said curved roller track.

3. The combination claimed in claim 1 wherein said pivotally mounted and spring-loaded coacting abutment is said supporting abutment and has a curved roller track thereon, and the other of said coacting abutments is a roller which is rotatably mounted on said brake lever for rotation about the point which produces the relatively low brake applying leverage.

No references cited.